Dec. 28, 1965     O. KRUSE     3,225,713
MATERIAL FEEDING DEVICE FOR TABLETING MACHINES AND THE LIKE
Filed Sept. 25, 1962     2 Sheets-Sheet 1

INVENTOR.
Otto Kruse
BY
Michael S. Striker

Dec. 28, 1965 O. KRUSE 3,225,713
MATERIAL FEEDING DEVICE FOR TABLETING MACHINES AND THE LIKE
Filed Sept. 25, 1962 2 Sheets-Sheet 2
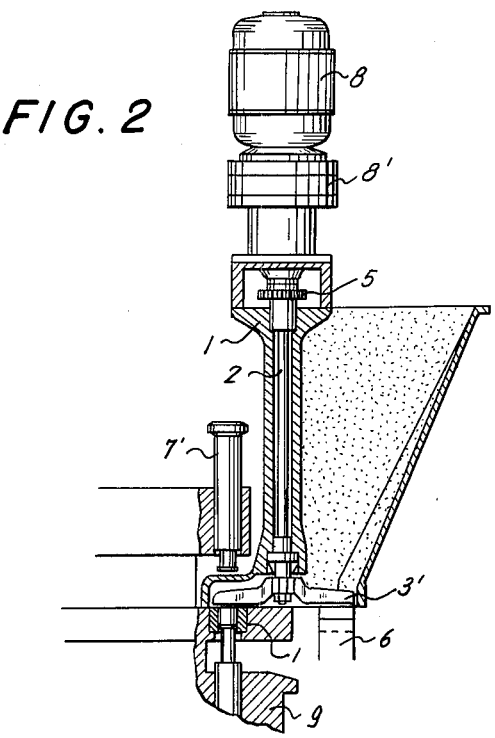
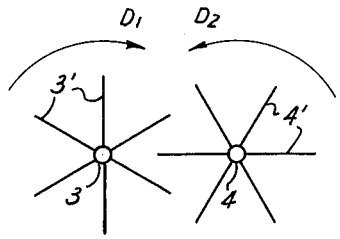
INVENTOR.
Otto Kruse
BY
Michael J. Striker
Atty

United States Patent Office 3,225,713
Patented Dec. 28, 1965

3,225,713
MATERIAL FEEDING DEVICE FOR TABLETING MACHINES AND THE LIKE
Otto Kruse, Eichenweg, Schwarzenbek, Germany, assignor to Wilhelm Fette, Schwarzenbek, Germany
Filed Sept. 25, 1962, Ser. No. 226,031
Claims priority, application Germany, Sept. 26, 1961, F 35,006
8 Claims. (Cl. 107—17)

The present invention relates to material-feeding devices, and in particular to material-feeding devices which are adapted to be used in tableting machines or the like.

In machines of this type where the material which is fed is in a particulate form which may range from granules to a fine powder, there is a particular problem involved in providing a reliable flow of the particulate material. Frequently the particulate material tends to agglomerate and form bridges and the like which retards the flow and may even stop the flow completely, and while there have been various attempts to overcome this problem, as by providing rollers with pins projecting therefrom in order to stir up the particulate material, this problem has not yet been satisfactorily solved and in many tableting machines it still happens not infrequently that the molds do not have their cavities uniformly and properly filled before the material in the molds is compacted.

It is accordingly a primary object of the present invention to provide for a machine of the above type a material-feeding structure which will guarantee that each mold cavity receives a sufficient amount of material to form a proper tablet or the like.

Another object of the present invention is to provide a structure which will not only reliably feed the particulate material but which will in addition mix the material just prior to the delivery thereof to a mold, so that in this way the uniformity of the components which go to make up the particulate mixture will be guaranteed and thus the homogeneity of the tablets will be assured.

It is furthermore an object of the present invention to provide a structure of the above type where the material will be pressed into the mold by the device which guarantees the flow of the material.

It is furthermore an object of the present invention to provide a device of the above type which is to a very large extent adjustable so that both with respect to its own construction as well as with respect to the manner of operation thereof it can be adapted to the properties of the particulate material which is being fed.

With the above objects in view the invention includes, in a tableting machine or the like, a hopper which is adapted to contain a particulate material and which has a bottom formed with an outlet through which the particulate material discharges from the hopper. A pair of rotary bladed wheels are located in the hopper closely adjacent to its outlet and respectively have blades which intermesh during rotation of these wheels, and the blades of each wheel are inclined with one face of each blade directed toward and the other face of each blade directed away from the bottom of the hopper.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a fragmentary sectional elevational taken along line 2—2 of FIG. 1 in the direction of the arrows;

FIG. 4 diagrammatically represents the operation of the structure of the invention.

Figure 1:
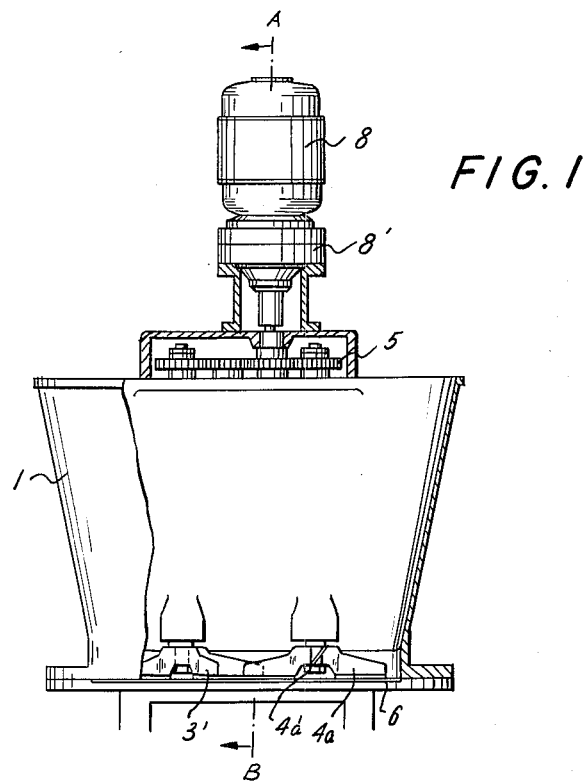
FIG. 1 is a partly sectional elevational view of a tableting machine which includes the structure of the invention.
Figure 3:
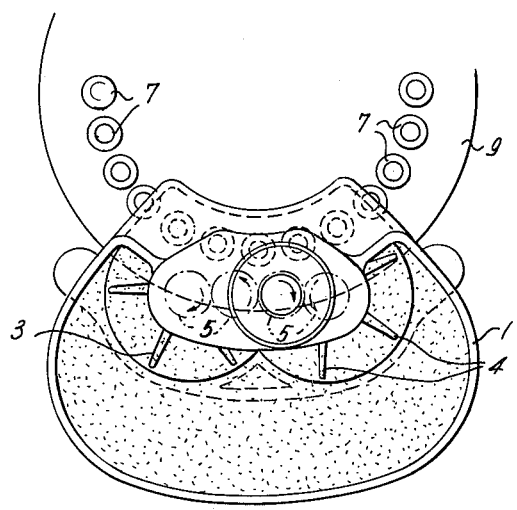
FIG. 3 is a fragmentary top plan view of the structure of the invention.

The tableting machine which is illustrated in FIGS. 1–3 in a schematic way includes a hopper 1 a wall of which is broken away in the illustration shown in FIG. 1 so as to clearly illustrate the structure of the invention which is in the interior of the hopper. One wall of the hopper 1 rotatably carries a pair of vertical drive shafts 2, one of which is shown most clearly in FIG. 2, and a suitable framework which is carried by the hopper, this framework being shown most clearly in FIG. 1, carries an electric driving motor 8 which through a steplessly variable drive 8', of known construction, drives the gearing 5 which is operatively connected to the shafts 2, in the manner shown most clearly in FIGS. 2 and 3, so that these shafts rotate in opposite directions.

The bottom of the hopper 1 is visible in FIG. 2, and the hopper is formed adjacent the left part of its bottom wall, as viewed in FIG. 2, with an outlet through which a particulate material in the interior of the hopper discharges. Closely adjacent to the outlet of the hopper are located a pair of bladed wheels 3 and 4 which are respectively fixed to the drive shafts 2 so as to be driven thereby in opposite directions. The blades of each wheel are inclined with respect to the wheel axis, and as is apparent from FIG. 4 the drive means 8, 5 drives the bladed wheels 3 and 4 in the opposite directions $D_1$ and $D_2$, indicated in FIG. 4, with the wheels being angularly positioned with respect to each other and with axes located close enough to each other so that the blades 3' and 4' interfinger in the manner shown in FIG. 4. A particular feature of the invention resides in the fact that each blade is inclined. This inclination is shown most clearly in FIG. 1 for the blade 4a of the wheel 4. As is apparent from FIG. 1 the right face of the blade 4a is inclined downwardly toward the bottom of the hopper while the left face is inclined upwardly away from the bottom of the hopper, and all of the blades are inclined in this way, and the invention includes a construction where the inclination of the blades is adjustable. For example, the hub of each wheel 3 and 4 can fixedly carry a plurality of elongated bolts extending radially from the axis of each wheel through elongated bores formed in the blades, respectively, and these bolts may carry suitable nuts at their outer ends which fix the blades to the wheels in adjusted angular positions. With this construction where these bolts extend through the bores of the blades to support the latter on the wheel, it is only necessary to loosen the nuts, reset the inclination of the blades, and tighten the nuts, in order to adjust the inclination of the blades. Although the pair of wheels 3 and 4 can be located in a common plane, as shown, it is also possible to locate them in planes which are offset one with respect to the other or which are inclined one with respect to the other.

The particulate material flows from the hopper 1, in a manner well known in the art, into the molds 7 which are carried by a rotary mold plate 9, the mold plate 9 placing the successive molds 7 of each row directly beneath the outlet of the hopper during the angular movement of the plate 9. After the particulate material has been located in a mold which has passed beyond the outlet of the hopper, the mold reaches a plunger 7' (FIG. 2) which in a manner known in the art compresses the particulate material in the mold, and in this way a tablet of predetermined size is formed.

Because of the above-described inclination of the blades

3′ and 4′, as well as because of the opposite directions of rotation thereof in the manner shown in FIG. 4, it is clear that the downwardly directed face of each blade leads the upwardly directed face thereof in the direction of rotation of each wheel, and as a result the downwardly directed face of each blade will compress the particulate material into the mold, and in addition the inclination of the blades as described above guarantees that uniform amounts of the particulate material will be delivered from the hopper to each mold, so that with this structure there is provided, in a most reliable manner, uniform amounts of particulate material in each mold, and in addition the material in each mold is inittially compressed to a predetermined degree before being compacted by the plunger 7′.

The mold-filling structure is carried by a support 6 which is placed on the table which carries the tableting machine.

Of course, the particular form of the blades 3′ and 4′ can be adapted to the particular material which is being fed. For example, for some materials it will be of advantage to give these blades 3′ and 4′ the configuration of combs, and for other materials it will be of advantage to provide apertured blades. Moreover, instead of straight blades which extend radially with respect to the axis of the wheels, it is possible to provide convexly curved blades which is particularly suitable for certain materials. Of course, the above-described structure for adjusting the inclination of each blade is also used in accordance with the nature of the material which is being fed to provide for the blades an inclination which is especially suited for the properties of the material. As is apparent from FIG. 4, not only do the rotary bladed wheels guarantee delivery of the material to the outlet of the hopper, but in addition they mix the material so that where the particulate material is a mixture of several different ingredients, the homogeneity of the tablets is also enhanced with the structure of the invention.

It will be understood that each of the elements described above, or two or more together, may also find a useful application in other types of material feeding devices differing from the types described above.

While the invention has been illustrated and described as embodied in tableting machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels having bottom edges closely adjacent to said bottom of said hopper and said blades being inclined with one face of each blade directed toward and the other face of each blade directed away from the bottom of the hopper and said one face of each blade leading said other face thereof in the direction of rotation of said wheels so that particulate material located in a mold directly beneath said outlet will be compressed by the movement of said one face of each blade across said outlet; and drive means operatively connected to said wheels for rotating them respectively in opposite directions with said one face of each blade leading said other face.

2. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels having bottom edges closely adjacent adjacent to said bottom of said hopper and said blades being inclined with one face of each blade directed toward and the other face of each blade directed away from the bottom of the hopper; drive means operatively connected to said wheels for rotating them respectively in opposite directions and with said one face of each blade leading said other face; and means cooperating with said drive means for steplessly adjusting the speed of rotation of said wheels.

3. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels having bottom edges closely adjacent to said bottom of said hopper and said blades being inclined with one face of each blade directed toward and the other face of each blade directed away from the bottom of the hopper, and each wheel including for each blade a means for adjusting the inclination thereof; and drive means operatively connected to said wheels for rotating them respectively in opposite directions with said one face of each blade leading said other face.

4. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels having bottom edges closely adjacent to said bottom of said hopper and said blades being inclined with one face of each blade directed toward and the other face of each blade directed away from the bottom of the hopper, and the blades of each wheel extending substantially radially with respect to the axis thereof; and drive means operatively connected to said wheels for rotating them respectively in opposite directions with said one face of each blade leading said other face.

5. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels being inclined with one face of each blade directed toward and the other face of each blade directed away from the bottom of the hopper, and the blades of each wheel being convexly curved; and drive means operatively connected to said wheels for rotating them respectively in opposite directions with said one face of each blade leading said other face.

6. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels being inclined with one face of each blade directed toward and the other face of each blade directed away from the bottom of the hopper, and said wheels being located in a common plane; and drive means operatively connected to said wheels for rotating them respectively in opposite directions with said one face of each blade leading said other face.

7. For use in a tableting machine, or the like, in combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels being inclined with one face of each blade directed toward and the other face of each blade directed away from the bottom of the hopper, and said wheels being respectively located in planes which are inclined with respect to each other; and drive means operatively connected to said wheels for rotating them respectively in opposite directions with said one face of each blade leading said other face.

8. For use in a tableting machine, or the like, combination, a hopper adapted to contain a particulate material and having a bottom formed with an outlet through which the particulate material is adapted to be discharged from the hopper; a pair of rotary, bladed wheels located in said hopper closely adjacent to said outlet and respectively having blades which interfinger during rotation of said wheels, the blades of said wheels being inclined with one face of each blade directed toward and the other face of each blade directed away from the bottom of the hopper and said one face of each blade leading said other face thereof in the direction of rotation of said wheels so that particulate material located in a mold directly beneath said outlet will be compressed by the movement of said one face of each blade across said outlet; and drive means operatively connected to said wheels for rotating them respectively in opposite directions and with said one face of each blade leading said other face.

References Cited by the Examiner
UNITED STATES PATENTS

| | | | |
|---|---|---|---|
| 1,177,855 | 4/1916 | Garfield | 107—17 |
| 1,686,804 | 10/1916 | Files | 107—17 |
| 1,912,575 | 6/1933 | Fonville. | |

ROBERT E. PULFREY, *Primary Examiner.*

JOSEPH D. BEIN, *Examiner.*